US006417878B2

(12) United States Patent
Tourai et al.

(10) Patent No.: US 6,417,878 B2
(45) Date of Patent: Jul. 9, 2002

(54) IMAGE FORMING APPARATUS AND IMAGE FORMING METHOD FOR IMPROVED GRADATION REPRODUCTION

(75) Inventors: Yutaka Tourai, Toyohashi; Masahiro Shiigi, Toyokawa, both of (JP)

(73) Assignee: Minolta Co., Ltd., Osaka (JP)

( * ) Notice: Subject to any disclaimer, the term of this patent is extended or adjusted under 35 U.S.C. 154(b) by 52 days.

(21) Appl. No.: 09/725,151

(22) Filed: Nov. 29, 2000

(30) Foreign Application Priority Data

Nov. 30, 1999 (JP) .......................................... 11-340207

(51) Int. Cl.[7] ............................ B41J 2/36; B41J 2/205; B41J 2/52; H04N 1/407

(52) U.S. Cl. ....................... 347/183; 347/184; 347/188; 400/120.07

(58) Field of Search ................................ 347/183, 184, 347/188; 358/1.9, 521, 523; 382/169; 400/120.07, 120.09

(56) References Cited

U.S. PATENT DOCUMENTS 4,893,177 A 1/1990 Tada et al.
5,126,757 A 6/1992 Yamada
5,220,350 A 6/1993 Fujii
5,287,418 A 2/1994 Kishida

*Primary Examiner*—Huan Tran
(74) *Attorney, Agent, or Firm*—Morrison & Foerster, LLP

(57) ABSTRACT

In a thermal printer, the print mode that has been set by the user is judged at the start of printing. When the high-speed print mode is set, the standard deviation σ of the original image data is calculated. According to the standard deviation σ, it is judged whether the densities are evenly distributed. When the densities are evenly distributed, a gradation conversion characteristic is selected for converting the gradation in the entire density range only by decreasing the number of gradation levels of the output image. When the densities are intensively concentrated in a specific density range, it is further judged whether the specific density range is the low, middle, or high density range. According to the judgement, the gradation values of input data are converted using a gradation conversion characteristic for decreasing the number of gradation levels of the output image and accurately reproducing the gradation in the specific density range.

20 Claims, 9 Drawing Sheets

IMAGE FORMING APPARATUS AND IMAGE FORMING METHOD FOR IMPROVED GRADATION REPRODUCTION

This application is based on an application No. 11-340207 filed in Japan, the content of which is hereby incorporated by reference.

BACKGROUND OF THE INVENTION (1) Field of the Invention

The present invention relates to an image forming apparatus that forms images on the recording medium such as a recording sheet, and especially relates to an image forming apparatus for reproducing gradation with improved correctness. Also, the present invention relates to an image forming method for reproducing gradation with improved correctness.

(2) Related Art

Generally, the digital image forming apparatus processes image data that has been input (input image data) for reproducing improved gradation. Then, an image is formed by the image forming unit according to the image data that has been processed (output image data). One of the data processing is the gradation conversion. In the gradation conversion, the characteristics of color development by the image forming unit are taken into account. The gradation values of the input image data are converted according to a predetermined gradation conversion characteristic so as to reproduce the gradation in the original image as accurately as possible.

The gradation conversion is used in the thermal transfer printer, which forms images using the thermal head. The thermal transfer printer forms an image as follows. According to image data, the thermal head is driven. The thermal head applies thermal energy to an ink sheet. Then, ink on the ink sheet is sublimed to be transferred onto a recording sheet. Even in this case, the gradation values of the input image data needs to be converted in advance according to the color reproduction characteristics of the ink sheet. Accordingly, the gradation conversion is used in the thermal transfer printer.

Note that when an image is formed using the thermal head, thermal energy is applied for each of the pixels of the image. In this case, however, it takes a relatively long period of time for the thermal energy reaches a predetermined amount. Accordingly, it takes a longer period of time for printing one image than other printing methods. This is problematic.

In order to solve the problem and to satisfy user needs to confirm printed image soon, a thermal transfer printer with both functions of normal print mode and high-speed print mode has been recently developed. In the normal print mode, an image is printed at normal speed. On the other hand, the image is printed at a higher speed than the normal speed in the high-speed print mode.

Note that the print density is reproduced according to the amount of thermal energy applied to the ink sheet in the thermal transfer printer. In the high-speed print mode, however, the period of time for applying thermal energy from the thermal head to the ink sheet to reproduce each of the pixels is relatively short. As a result, enough amount of thermal energy may not be applied for some pixels. Accordingly, it is inevitable that the reproduced maximum density is low and the range of reproduced density is narrow in the high-speed print mode compared with the normal print mode.

Although the range of reproduced density is limited to the lower density range in the high-speed print mode, images are formed under the same gradation conversion condition as the normal print mode in the conventional thermal transfer printer. Under the circumstances, the gradation cannot be correctly reproduced and eventually the quality is low in the higher density range of reproduced images.

The problem of the gradation deterioration in reproduced images is not limited to the thermal transfer printer. This problem arises for the image forming apparatus in which the reproduced density depends on the amount of applied thermal energy (referred to the "thermal image forming apparatus" in this specification) such as an image forming apparatus that records images on the thermal paper using the thermal head.

SUMMARY OF THE INVENTION

It is accordingly an object of the present invention to provide a thermal image forming apparatus by which the image forming speed is increased while the gradation of the output image is maintained as correctly as possible.

The above-mentioned object may be achieved by an image forming apparatus that forms an image on a recording medium, the image forming apparatus that includes: a speed setter that sets an image forming speed according to a user direction; a gradation conversion characteristic selector that stores a plurality of gradation conversion characteristics and selects one of the gradation conversion characteristics, the gradation conversion characteristic corresponding to the image forming speed; a data converter that converts gradation values of input image data to generate output image data according to the selected gradation conversion characteristic; and an image forming unit that forms an image on the recording medium according to the output image data at the image forming speed.

In the image forming apparatus, the gradation conversion characteristic selector can set the optimal gradation conversion characteristic even if the speed setter sets the faster image forming speed to change the reproduced density range. As a result, the gradation can be correctly maintained in the reproduced image while the image forming speed is increased.

The above-mentioned object may be also achieved by an image forming apparatus that forms an image on a recording medium, the image forming apparatus that includes: a judging unit that judges a density characteristic of input image data; a speed setter that sets an image forming speed according to a judgement result of the judging unit; a data converter that converts gradation values of the input image data to generate output image data; and an image forming unit that forms an image on the recording medium according to the output image data at the image forming speed.

In the image forming apparatus, the density characteristic of the input image data is judged and the image forming speed is changed according to the judgement result. Accordingly, the image forming speed is increased when it is judged that the input image data has a density characteristic that has little effects on gradation reproduction even if the image forming speed is increased. By doing so, the gradation can be correctly maintained in the reproduced image while the image forming speed is increased.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENTS

Explanations of the preferred embodiments of the thermal image forming apparatus of the present invention will be given below.

Figure 1:
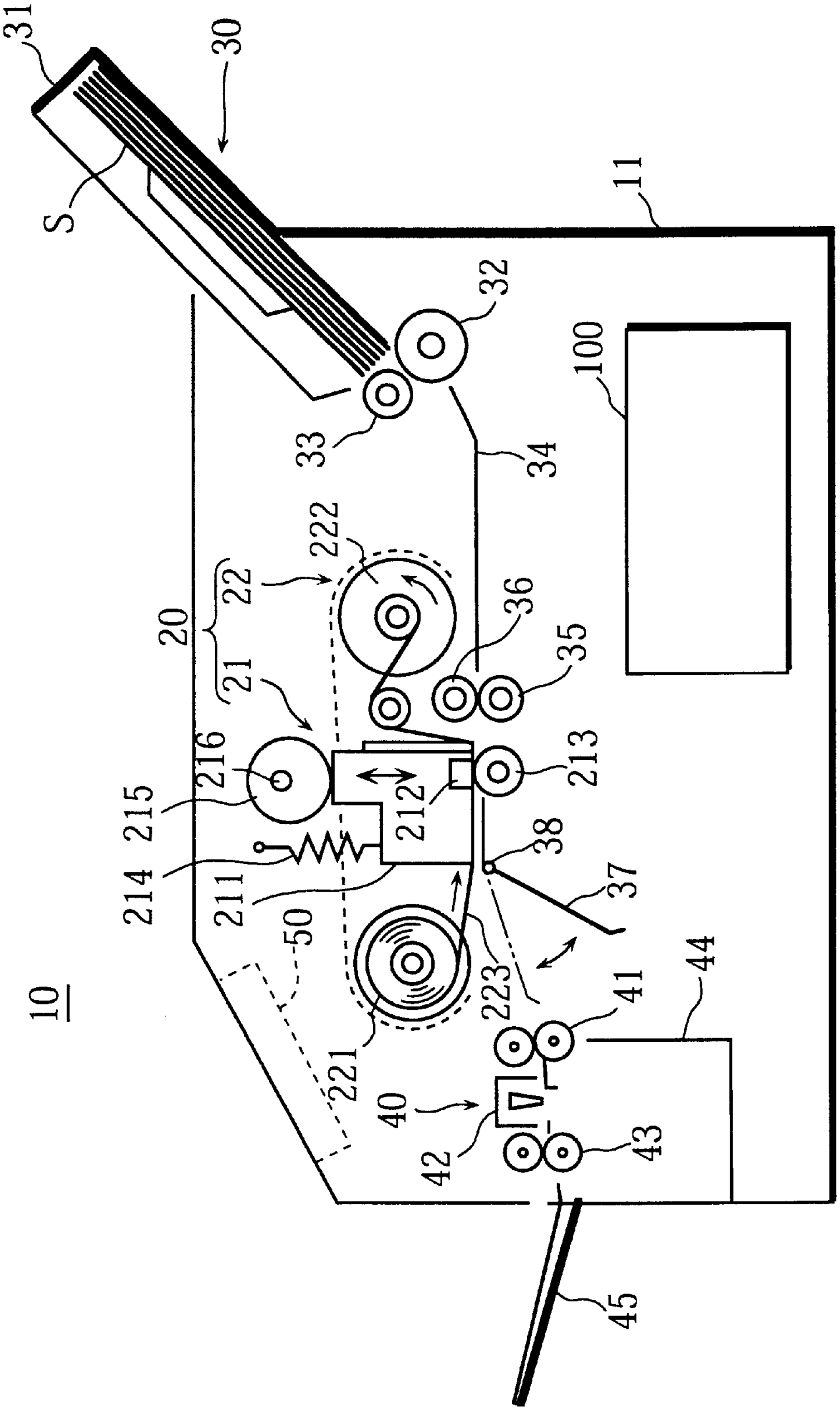
FIG. 1 shows an overall construction of a thermal transfer printer according to the first embodiment of the present invention.

The First Embodiment (1) Overall Structure and Printing Operation of Thermal Transfer Printer FIG. 1 shows an overall construction of a thermal transfer printer 10 according to the first embodiment of the present invention.

As shown in FIG. 1, the thermal transfer printer 10 includes a printing unit 20, a paper feed unit 30, a paper exit unit 40, and a controller 100. The printing unit 20 is disposed at almost the central position of a housing 11. The paper feed unit 30 feeds a recording sheet to the printing unit 20. The paper exit unit 40 transports a recording sheet on which an image has been printed onto a paper tray 45. The controller 100 controls the operations of the printing unit 20, the paper feed unit 30, and the paper exit unit 40.

Meanwhile, the printing unit 20 includes a transferring unit 21 and an ink sheet supplying unit 22. The ink sheet supplying unit 22 supplies an ink sheet to the transferring unit 21. The transferring unit 21 further includes a printing block 211, a thermal head 212, and a platen roller 213. At the bottom of the printing block 211, the thermal head 212 is mounted. The platen roller 213 is disposed so as to face the thermal head 212. The printing block 211 cools down the thermal head 212. Also, the printing block 211 is held by a frame (not illustrated) so as to vertically slide. Furthermore, an upward force is applied to the printing block 211 (in the direction apart from the platen roller 213) by an extension spring 214. At the top of the printing block 211, an eccentric cam 215 comes into contact with the printing block 211. By rotating the eccentric cam 215 on a driving shaft 216 using a rotation drive (not illustrated), the thermal head 212 comes in contact with and separates from the platen roller 213.

The thermal head 212 has a well-known structure. More specifically, the thermal head 212 consists of a plurality of heating elements that are arranged in a row in a direction orthogonal to the transport direction of a recording sheet “S” (in the main scanning direction) at a certain pixel pitch. Also, the entire length of the thermal head 212 in the direction of the arrangement is approximately equal to the width of the largest recording sheet for the thermal transfer printer 10 in the main scanning direction.

Meanwhile, the ink sheet supplying unit 22 includes an ink sheet supplying reel 221 and an ink sheet wind-up reel 222. Before used, an ink sheet is wound around the ink sheet supplying reel 221, while after used, the ink sheet is reeled in the ink sheet wind-up reel 222. The ink sheet wind-up reel 222 is driven to rotate by a drive (not illustrated) so as to reel in the ink sheet in synchronization with the transport of the recording sheet “S”.

On the surface of the ink sheet 223 facing the platen roller 213, a layer of heat sensitive black ink is formed. The amount of ink corresponding to the amount of thermal energy that has been applied by the thermal head 212 is transferred to a recording sheet for each of the pixels. As a result, an image consisting of the pixels each of which has a density corresponding to the amount of applied thermal energy is formed on the recording sheet.

The paper feed unit 30 includes a paper feed cassette 31, a paper feed roller 32, and a pick-up roller 33. The paper feed cassette 31 holds a pile of recording sheets “S” that is not soft such as the photographic paper. The paper feed roller 32 and the pick-up roller 33 that are disposed so as to face each other to feed one piece of recording sheet “S” at one time in the direction of the platen roller 213.

The paper exit unit 40 includes a first paper exit roller pair 41, a second paper exit roller pair 43, and a cutting device 42. The cutting device 42 is a well-known one and is disposed between the first and second exit roller pairs 41 and 43. Blank top and bottom margins of a recording sheet “S” that has been transported from the printing unit 20 can be cut by the cutting device 20. The margins cut away from recording sheets “S” by the cutting device 42 are collected in a wastepaper basket 44, which is eventually emptied by the user.

Figure 2:
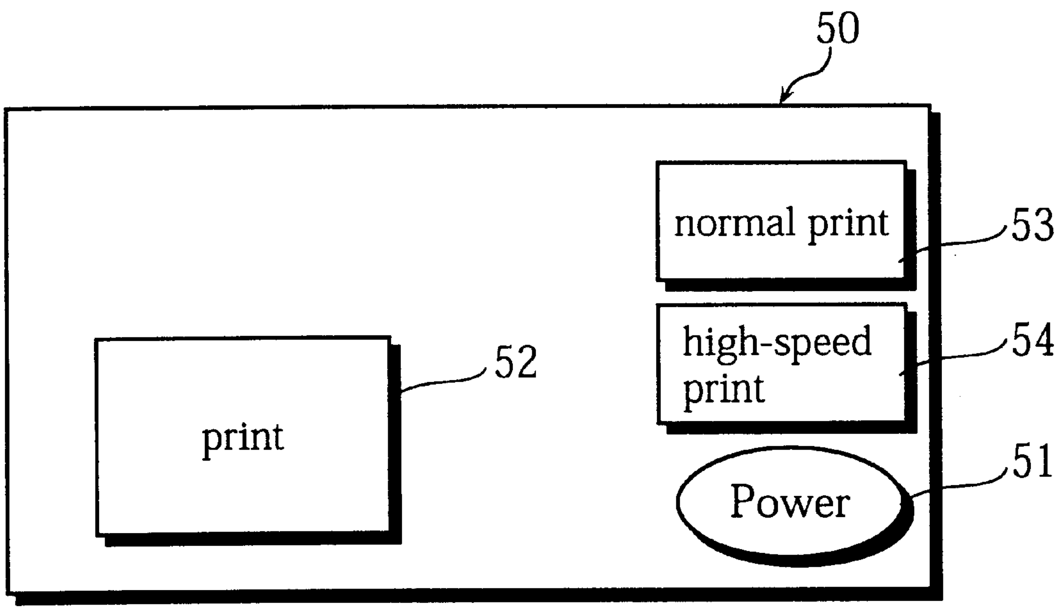
FIG. 2 shows an example of the operation panel of the thermal transfer panel in FIG. 1.

On the housing 11, an operation panel 50 is disposed at an appropriate position. FIG. 2 shows an example of the key arrangement of the operation panel 50. The operation panel 50 is provided with a power key 51, a print key 52, a normal print key 53, and a high-speed print key 54. The power of the thermal transfer printer 10 is turned ON and OFF using the power key 51. Printing is instructed using the print key 52. The print mode is switched between the normal print mode and the high-speed print mode using the normal print key 53 and the high-speed print key 54.

The construction of the thermal transfer printer 10 has been described. Here, an explanation of the printing operation by the thermal transfer printer 10 will be given below.

Image data is input from an external terminal such as the personal computer, the scanner, the card reader that reads image information of the memory card for the digital camera (referred to the “external terminal” in this specification). The input image data undergoes data processing and the gradation conversion which each will be described later in the controller 100. Then, the image data is stored in the internal image memory in one page units.

When the user presses the print key 52, the paper feed unit 30 starts feeding a recording sheet “S”. At this time, the thermal head 212 is kept at the standby position apart from the platen roller 213. Meanwhile, an swinging guide 37, which is swung by a driver (not illustrated) to make a seesaw movement about a shaft 38, is kept at the lowest point (indicated by a solid line in FIG. 1) by the driver. The recording sheet "S" is transported till the rear end reaches the transfer position of the platen roller 213. After that, the eccentric cam 215 is rotated so as to lower the printing block 211, and the thermal head 212 presses the ink sheet 223 against the recording sheet "S".

Then, while the platen roller 213 and paper transport rollers 35 and 36 are reversed, the thermal head 212.starts transferring a monochrome image onto the recording sheet "S" (reverse printing method). When the front end of the recording sheet "S" reaches the transfer position, the platen roller 213 and the paper transport rollers 35 and 36 are stopped reversing. Also, the printing block 211 is raised upward so as to separate the ink surface of the ink sheet 223 from the upper surface of the recording sheet "S".

Next, the swinging guide 37 is moved upward so that the recording sheet "S" is transported towards the paper exit roller pair 41 by the paper transport rollers 35 and 36. After that, any unwanted margins of the recording sheet "S" are cut away by the cutting device 42. Then, the recording sheet "S" is transported onto the paper tray 45 by the second paper exit roller pair 43.

(2) Structure of Controller 100

Figure 3:
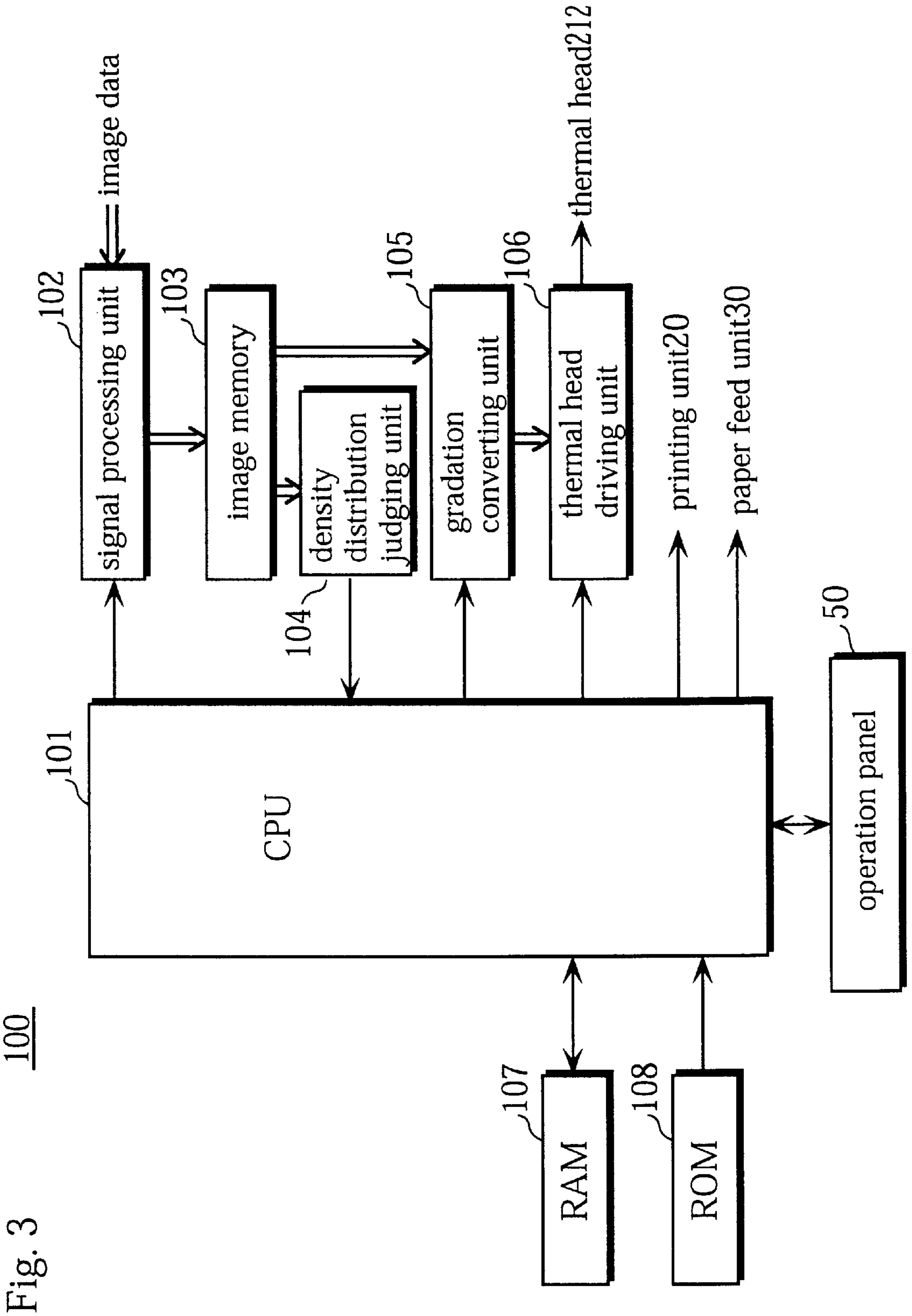
FIG. 3 is a block diagram showing the structure of the controller in the thermal transfer printer in FIG. 1.

FIG. 3 is a block diagram showing the structure of the controller 100 in the thermal transfer printer 10.

As shown in FIG. 3, the controller 100 includes a CPU 101, a signal processing unit 102, an image memory 103, a density distribution judging unit 104, a gradation converting unit 105, a thermal head driving unit 106, and a RAM 107 and a ROM 108.

Image data that has been input from an external erminal undergoes well-known image processing such as edge enhancement and smoothing. After that, the image data is stored in the image memory 103 for each page.

The density distribution judging unit 104 reads from the image memory 103 the image data for one page that is to be printed next according to the instruction from the CPU 101. Then, the density distribution judging unit 104 judges whether the densities are evenly distributed and informs the CPU 101 of the result of the judgement.

The CPU 101 selects one of the look-up tables (referred to "LUT"s in this specification) in the ROM 108 that indicates gradation conversion characteristic appropriate to the density characteristic of the original image according to the judgement result. Then, the CPU 101 informs the gradation converting unit 105 of the information of the selected LUT.

The gradation converting unit 105 reads the image data of the corresponding page from the image memory 103. Then, after performing the gradation conversion processing on the read image data according to the selected LUT, the gradation converting unit 105 outputs the image data to the thermal head driving unit 106. The thermal head driving unit 106 drives the thermal head 212 according to the image data in which the gradation values have been converted. Also, the thermal head driving unit 106 executes the printing operation, which has been described, to form an image on the recording sheet "S".

In the ROM 108, LUTs 0 to 4 are stored. As shown in FIGS. 4A, 4B, 5A, 5B, and 5C, the LUTs 0 to 4 indicate gradation conversion characteristics.

Figure 4A:
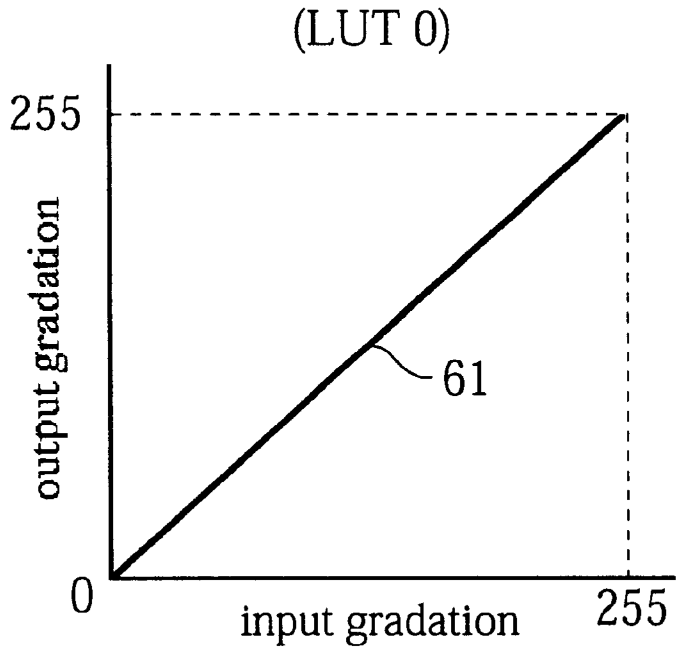
FIGS. 4A and 4B show the characteristics of look-up tables for gradation conversion that are stored in the ROM in the controller in FIG. 3.

The LUT 0 in FIG. 4A indicates the gradation conversion characteristic that is used in the normal print mode. In the normal print mode, the print speed is set so that an image is reproduced with approximately the same density range of the original image. For this reason, a 256-level input gradation is converted into a 256-level output gradation according to a gradation conversion curve 61 in the LUT 0.

Figure 4B:
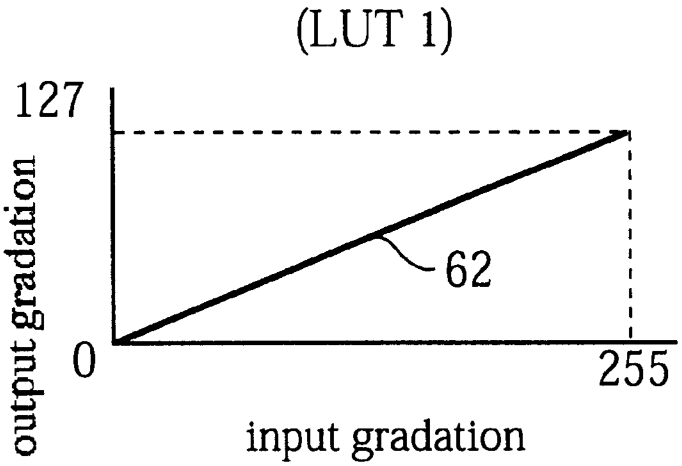

The LUT 1 in FIG. 4B indicates the gradation conversion characteristic that is used in the high-speed print mode when the densities of the image data are evenly distributed. In the high-speed print mode, the print speed is twice as fast as in the normal print mode, so that the maximum thermal energy that is applied to reproduce each of the pixels is a half of that in the normal print mode. As a result, the range of reproducible densities is. reduced to a lower half of the density range of the input image. More specifically, a gradation conversion curve 62 in the LUT 1 is a gradient so as to convert a 256-level input gradation into a 128-level output gradation that has a half gradation levels, i.e., levels zero to 127. Accordingly, the density resolution is lowered. For instance, two levels of input gradation is expressed by one level of output gradation. Conventionally, however, gradation in the higher density range has not been almost never reproduced. Compared with this, gradation is reproduced with highly improved correctness.

Figure 5A:
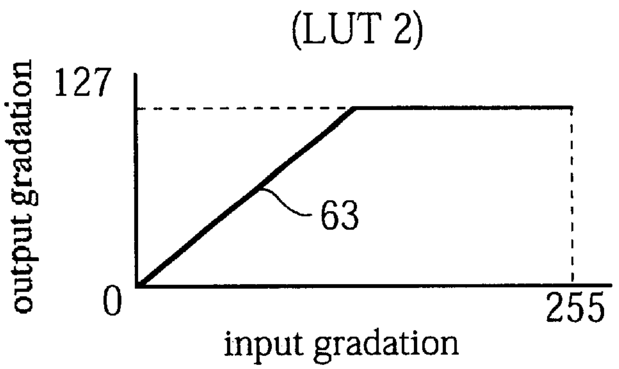
FIGS. 5A to 5C show the characteristics of other look-up tables for gradation conversion that are stored in the ROM in the controller in FIG. 3.
Figure 5B:
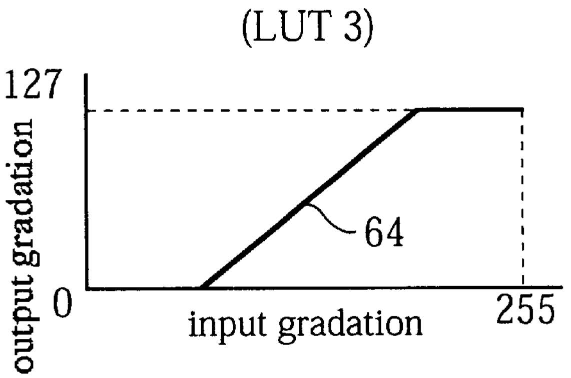
Figure 5C:
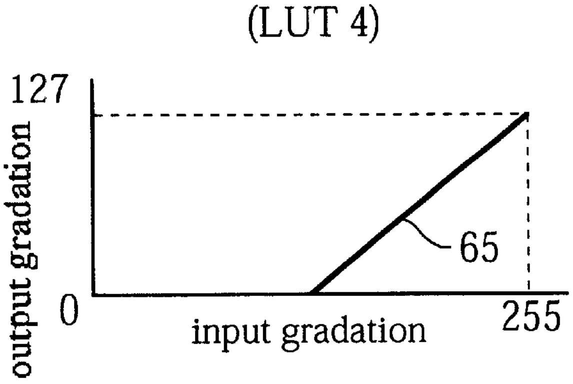

Each of the LUTs 2 to 4 in FIGS. 5A to 5C indicates a gradation conversion characteristic that is used in the high-speed print mode when the densities of the image data of an orignal document are intensively concentrated in a specific density range. As in the case of the LUT 1 in FIG. 4B, the print speed is twice as fast as in the normal print mode, so that a 256-level input gradation is converted into a 128-level output gradation. Also in this case, the density range is limited to a specific density range.

Figure 6A:
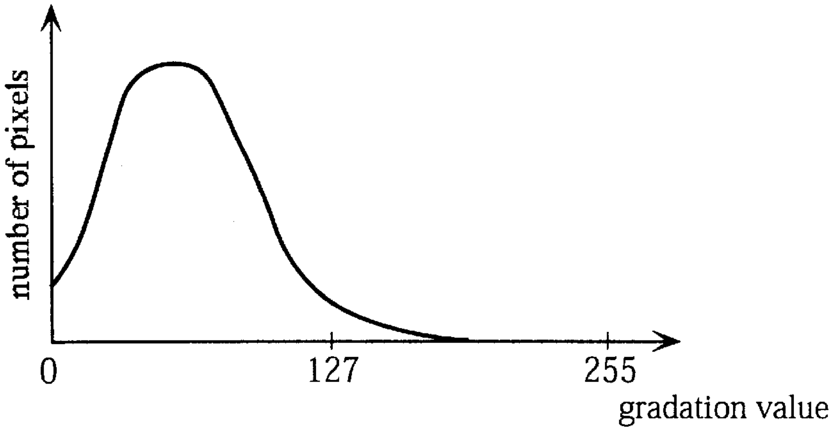
FIGS. 6A to 6C show examples of density distribution when densities of input image data are unevenly distributed.
Figure 6B:
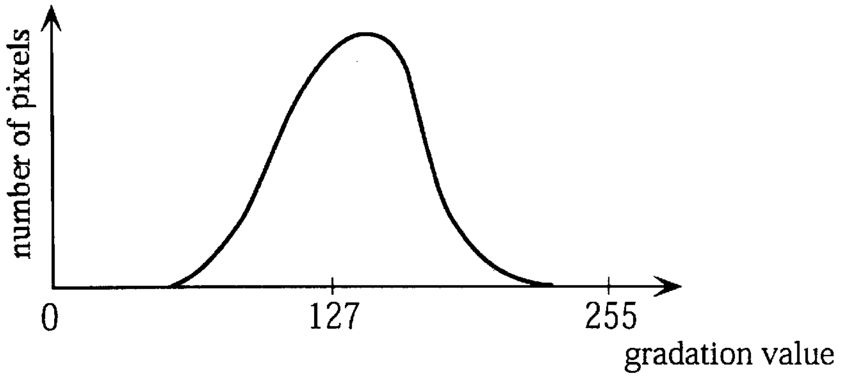
Figure 6C:
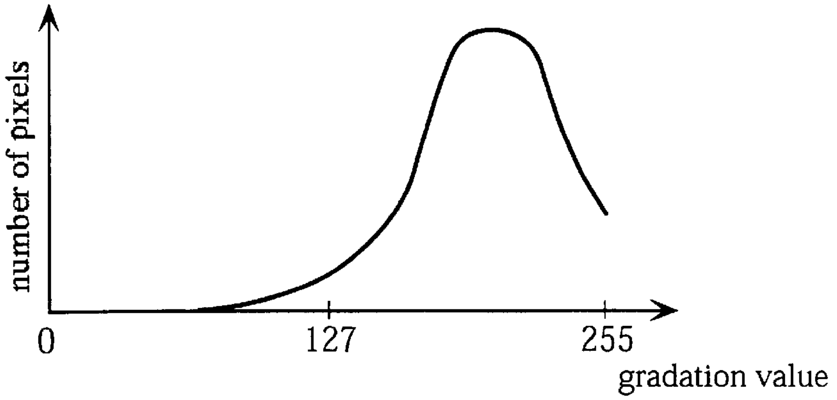

Each of FIGS. 6A to 6C shows how typically the densities of the original image data is distributed in a specific distribution range. FIGS. 6A to 6B show that densities are distributed in lower, middle, and higher density ranges, respectively. When it is apparent that the densities of an original image are intensively concentrated in a specific density range as shown in FIGS. 6A to 6B, it is sufficient to keep the gradation in the specific density range in the gradation conversion. Accordingly, when the densities of an original image are intensively concentrated in a lower density range as shown in FIG. 6A, the LUT 2 is selected, for instance. By doing so, gradation in a lower density range can be satisfactorily converted according to the gradation conversion curve 63 in FIG. 5A. Similarly, for the density distributions in FIGS. 6B and 6C, the LUTs 3 and 4 are selected, respetively. As a resutl, gradations in middle and higher density ranges can be satisfactorily converted according to the gradation conversion curves 64 and 65 in FIGS. 5B and 5C.

Here, refer to FIG. 3. The RAM 107 temporarily stores the contens set by the operation panel 50 and a variety of variables for contolling. The ROM 108 stores the LUTs 0 to 4 and the control program for printing processing. The CPU 101 controls the printing unit 20, the paper feed unit 30, and the paper exit unit 40 so that the print mode designated by the operaiton panel 50 is executed according to the control program stored in the ROM 108. As a result, smooth printing operation is performed.

(3) Control by Controller 100

Here, an explanation of the control by the controller 100 will be given.

Figure 7:
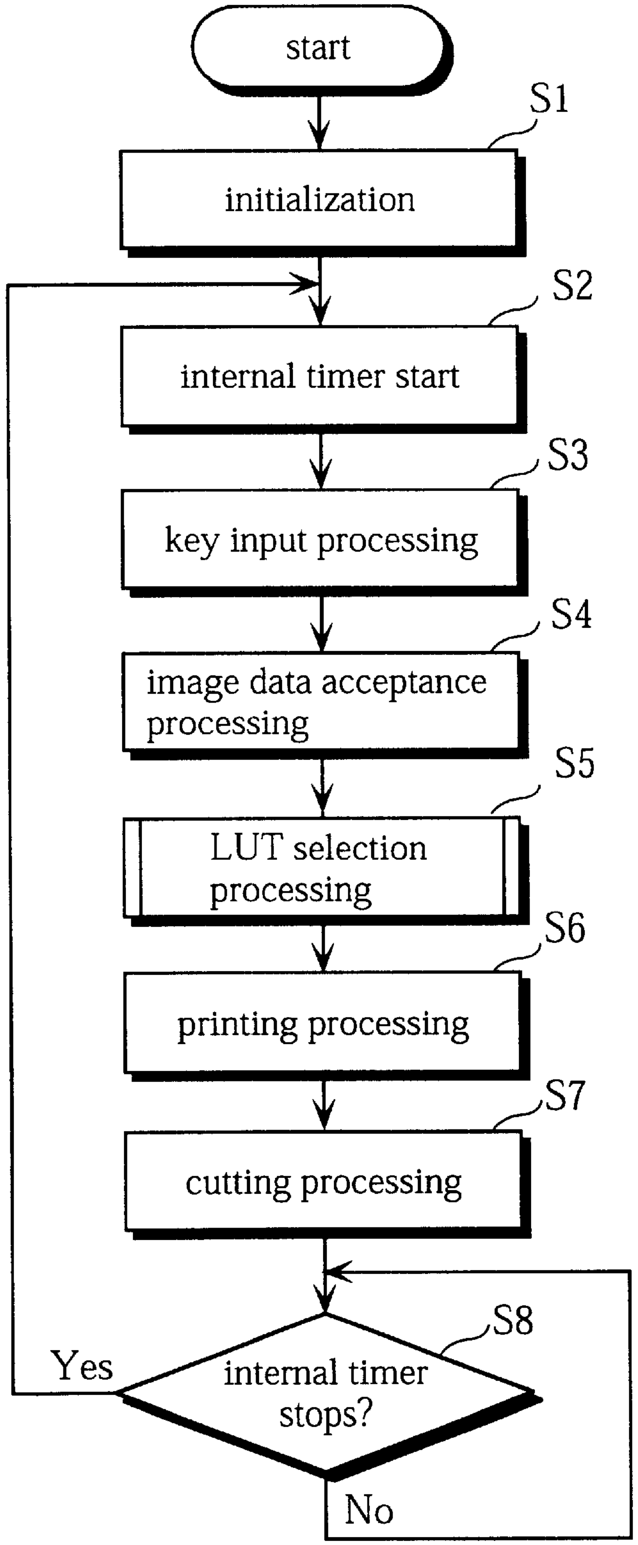
FIG. 7 is a flowchart illustrating the main routine of the control of the thermal transfer printer in FIG. 1 by the controller.

FIG. 7 is a flowchart illustrating the main routine of the overall control of the thermal transfer printer 10 by the controller 100.

When the thermal transfer printer 10 is turned ON, initialization is performed. More specifically, the register in the CPU 101 and the memory contents in the RAM 107 are initiarized. Also, the driving system including the printing unit 20 are reset to be positioned at the standard positions (step S1). At step S2, the timer in the CPU 101 is started.

Then, the key input by the user via the operation panel 50, for instance, the print mode designation, is accepted. Also, the contents of the designation is stored in the RAM 107 to execute the key input processing (step S3). At step S4, the image data that has been input from the external terminal is accepted. After processed in the signal processing unit 102, the image data is stored in the image memory 103 in one page units. Next, the LUT selection processing is executed according to the designated print mode and the density distribution of the original image data (step S5). According to the selected LUT, the printing processing is executed (step S6). In the printing processing, driving signals are output to the thermal head 212 while the density values of the image data in the image memory 103 are converted. Also, as has been described, the printing unit 20 and the paper feed unit 30 are operated to form an image on the recording sheet "S". As necessary, margins of the recording sheet "S" are cut away by the cutting device 42 (step S7).

Then, when the internal timer stops, the processing returns to step S2. By starting the timer again and repeating the processing at steps s3 to s8, the main routine is executed under time management.

Figure 8:
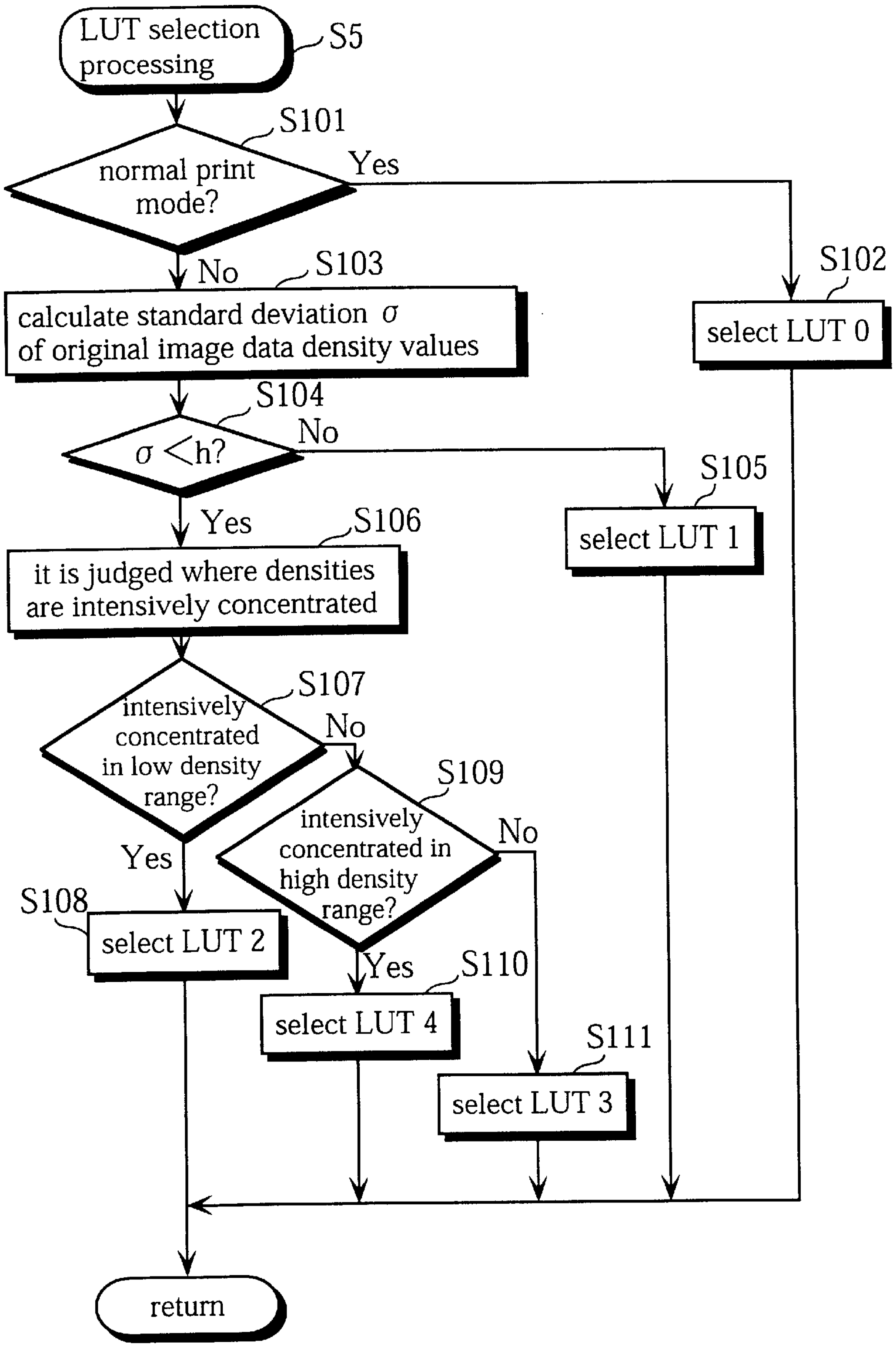
FIG. 8 is a flowchart illustrating the subroutine of the LUT selection processing at step S5 in the flowchart in FIG. 7.

FIG. 8 is a flowchart illustrating the subroutin of the LUT selection processing at step S5 in the flowchart in FIG. 7.

At step S101, it is judged whether the normal print mode has been set. This is judged by confirming the contents that has been set in the RAM 107 by the key input processing at step S3 in FIG. 7. When it is judged that the normal print mode has been set, the previous gradation conversion continues to be used. As a result, the LUT 0 with the gradation conversion characteristic in FIG. 4A is selected (step S102), and the processing returns to the main routine in FIG. 7. Here, to "select" a specific LUT is, more specifically, to read the data of the corresponding LUT from the ROM 108 and stores the data in the RAM 107, which is used as the work area (the same applies in the following cases).

When it is judged that the high-print mode has been set at step S101, the processing advaces to step S103. At step S103, the standard deviation σ of the density values of the original image data that is to be reproduced is calculated.

For instance, suppose that N pixels are included in one page and the density value of the "i"th pixel is "di", the standard deviation σ is calculated according to the equation given below.

$$\sigma = \sqrt{\frac{1}{N}\sum_{i=1}^{N}(di - da)^2}$$

Here, the term "da" indicates the average value of the density values of the all pixels in the original image.

The standard deviation σ, which is calculated in this manner, indicates how evenly the densities are distributed in the corresponding page. The higher the standard deviation σ, the more evenly the densities are distributed in the entire density range from density values zero to 255. On the other hand, the lower the standard deviation σ, the more intensively the densities are concentrated in a specific density range.

At the next step (step S104), it is judged whether the value of the standard deviation σ is smaller than a predetermined threshold value "h". The threshold value "h" is empirically determined. In the present embodiment, the threshold value "h" is set to be "70". Generally speaking, the densities of the natural image tends to be unevenly distributed and intensively concentrated in a certain density range. In many cases, the standard deviation σ of the density values is smaller than 70. On the other hand, the densities of the CG (computer graphics) tends to be evenly distributed. The standard deviation σ is no smaller than 70 in many cases.

When the standard deviation σ is no smaller than the threshold value "h" (when the result of the judgement at step S104 is "No"), it is judged that the densities are evenly distributed. Accordingly, the LUT 1 (refer to FIG. 4B) is selected to halve the number of the gradation levels of the output image.

On the other hand, when the standard deviation σ is smaller than the threshold value "h" (when the result of the judgement at step S104 is "Yes"), it can be judged where the densities are intensively concentrated. Accordingly, the processing advances to step S106 to determine a certain density range where the densities are intensively concentrated.

More specifically, gradation values 0 to 127 are defined as the low density range, 64 to 191 as the middle density range, 128 to 255 as the high density range. Then, the number of pixels (the frequency of pixels) for each of the gradation values are added up and the sum is divided by the number of gradation levels (128) for each of the density ranges. By doing so, the average number of pixels is calucultaed for each of the density ranges. The density range with the highest average pixel number is a density range where the densities are intensively concentrated.

When it is judged that the densities are intensively concentrated in the low density range at step S107 in FIG. 8, the processing advances to step S108. At step S108, the LUT 2 (refer to FIG. 5A) is selected to halve the number of gradation levels and accurately reproduce the gradation of the original image data in the low density range. On the other hand, when the densities are intensively concentrated in the high density range (when the result of the judgement is "No" at step S107 and "Yes" at step S109), the LUT 4 (refer to FIG. 5C) is selected to halve the number of gradation levels and accurately reproduce the gradation of the original image data in the high density range (step S100). Moreover, when the densities are intensively concentrated in the middle density range (when the result of the judgement at step S109 is "No"), the LUT 3 (refer to FIG. 5B) is selected to halve the number of gradation levels and accurately reproduce the gradation of the original image data in the middle density range (step S111). Then, the processing returns to the main routine in FIG. 7.

At step S6 in FIG. 7, the gradation is converted according to the selected LUT. Also, the thermal head 212 is driven according to the converted image data, and ink on the ink sheet 223 is thermally transferred onto the recording sheet "S" with the densities corresponding to the converted gradation values to form an image.

As has been described, when the high-speed print mode is set, the original image is not accurately reproduced in the higher density range. Also, the density range of the reproduced image becomes narrower. Accordingly, gradation is converted so as to halve the number of gradation levels. In addition, when the densities are unevenly distributed, the gradation conversion is performed so as to keep the gradation in the specific density range where the densities are intensively concentrated. By doing so, the gradation of the original image can be accurately kept and the image quality can be prevented from deteriorating. Accordingly, the print speed can be increased while preventing the image quality deterioration.

The Second Embodiment

In the first embodiment, the user designates the print mode, and the printing processing is executed according to the user designation and the density distribution of the original image data. On the other hand, the density distribution of the original image is analyzed first in the second embodiment. Then, the print mode is determined and the optimal LUT is selected for gradation conversion according to the analysis. For this reason, the thermal transfer printer 10 and the controller 100 are the same as in the first embodiment. The second embodiment, however, is different from the first embodiment in the control by the controller 100. Accordingly, an explanation given below will be focused on the different control operations.

The main routine of the control of the thermal transfer printer 10 is almost the same as the flowchart shown in FIG. 7. In the key input processing at step S3, however, no print mode is set in the second embodiment. Also, the LUT selection processing at step S5 is replaced by the "print speed decision & LUT selection processing" (step S50). At step S50, the print mode is automatically determined and the optimal LUT is selected.

Figure 9:
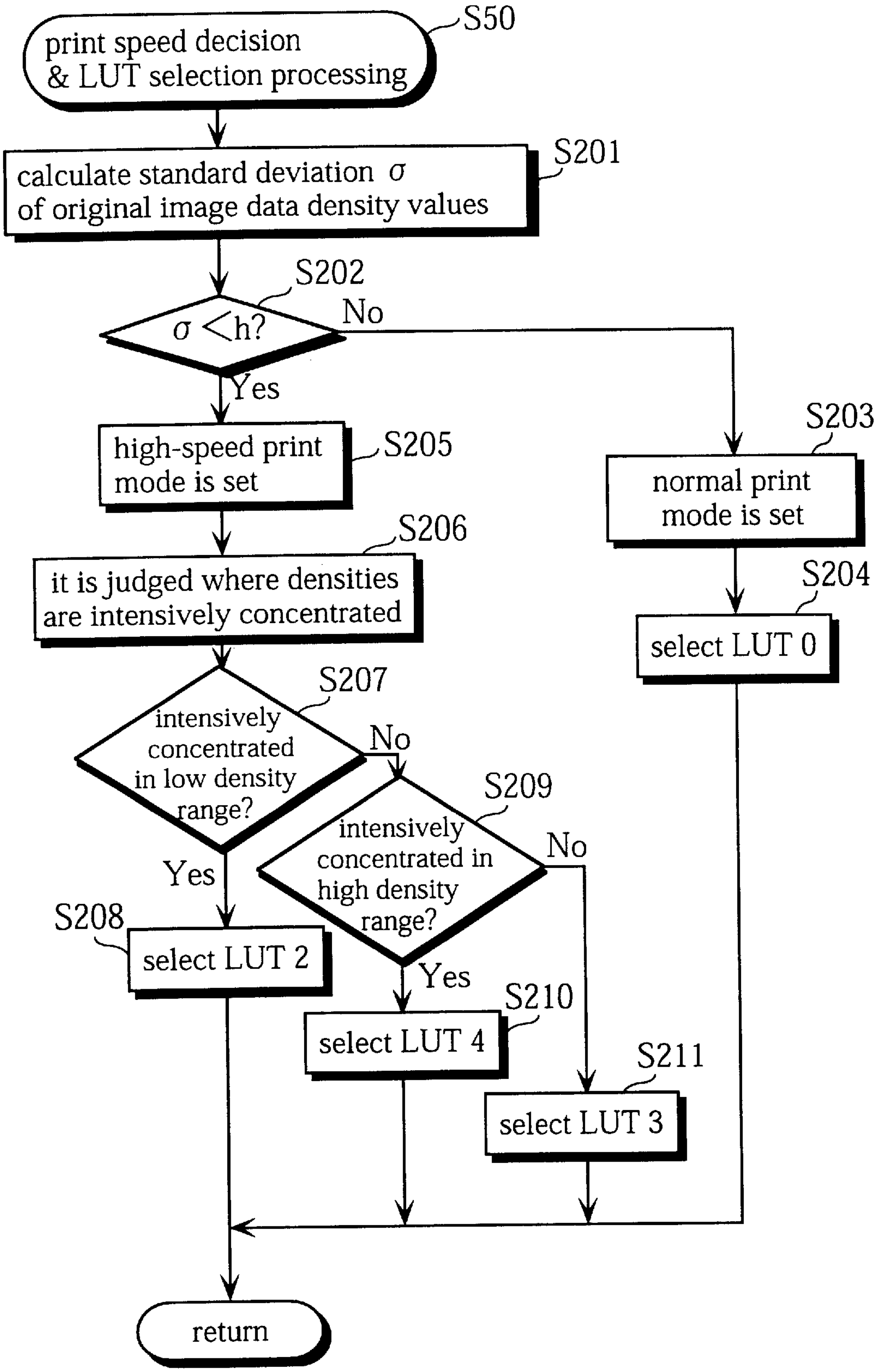
FIG. 9 is a flowchart illustrating the subroutine of the print speed decision & LUT selection processing in the second embodiment of the present invention.

FIG. 9 is a flowchart illustrating the content of step S50.

First of all, the standard deviation σ of the density values of the original image data is calculated at step S201 in the same manner as in step S103 in the flowchart in FIG. 8. Then, it is judged whether the standard deviation σ is smaller than the threshold value "h" (step S202). When the standard deviation σ is no smaller than the threshold value "h" (when the result of the judgement at step S202 is "No"), the densities are evenly distributed as has been described. In this case, gradation reproduction in the entire density range is the top priority. Accordingly, the normal is set and the LUT 0 is selected (steps s203 and s204). The processing returns to the main routine in FIG. 7.

On the other hand, when it is judged that the standard deviation σ is smaller than the threshold value "h" at step S202, the densities are intensively concentrated in a specific density range. In this case, only if the gradation in the specific density range is accurately reproduced, the image quality does not deteriorate even if the print speed is increased. Accordingly, the high-speed print mode is set (step S205) and the processing advances to step S206. At step S206, it is judged where the densities are intensively concentrated in the same manner as in step S106.

Then, when it is judged that the densities are intensively concentrated in the low density range at step S207, the LUT 2 (refer to FIG. 5A) is selected to halve the number of gradation levels and accurately reproduce the gradation of the original image data in the low density range (step S208). On the other hand, when the densities are intensively concentrated in the high density range instead of the low density range (when the result of the judgement is "No" at step S207 and "Yes" at step S209), the LUT 4 (refer to FIG. 5C) is selected to halve the number of gradation levels and accurately reproduce the gradation of the original image data in the high density range (step S210). Moreover, when the densities are intensively concentrated in the middle density range (when the result of the judgement at step S209 is "No"), the LUT 3 (refer to FIG. 5B) is selected to halve the number of gradation levels and accurately reproduce the gradation of the original image data in the middle density range (step S211). Then, the processing returns to the main routine in FIG. 7.

At step S6 in the flowchart in FIG. 7, the gradation values in the original image data are converted according to the selected LUT. Also, the printing processing is executed according to the print mode that has been set.

As has been described, the combination of the print mode and the LUT is selected according to the density distribution. By doing so, the printing processing can be executed as fast as possible with minimum deterioration of the image quality. Especially, when the densities are intensively concentrated in the low density range, the print speed can be doubled while the densities and gradation are reproduced at the same level as in the normal print mode. This is highly effective.

Other Possible Modifications

The present invention is not limited to the first and second embodiments. Other possible modifications are given below.

(1) While the monochrome thermal transfer printer has been described in the embodiments, the present invention can be applied to the color thermal transfer printer.

In this case, a color ink sheet is used as the ink sheet 223. On the color ink sheet, layers of heat sensitive cyan (C), magenta (M), and yellow (Y) ink are formed in order with almost the same pitch as the length of the recording sheet "S" in the transport direction.

The input image data is generally density data that has been separated into R (red), G (green), and B (blue). The density data of R, G, and B undergoes the edge enhancement and the smoothing and the density data is then converted into density data of reproduction colors, i.e., C, M, and Y . After that, the density data is stored in the image memory for each original page.

At the printing, for instance, the density data of cyan is read. The image is thermally transferred onto the recording sheet "S". Here, the density of each pixel of the image corresponds to the amount of the thermal energy that has been applied for each of the pixels by the thermal head 212. Then, the recording sheet "S" is returned to the original position, and a magenta image is transferred onto the recording sheet "S" so as to superimpose the magenta image on the cyan image. After that, the same transferring operation is executed for a yellow image to form a color image by the multi layer transfer.

As has been described, the control by the controller 100 is almost the same as the flowcharts shown in FIGS. 7 to 9 apart from repeating the printing operation for each of the reproduction colors, C, M, and Y. Note that attention should be paid when the standard deviation σ of the density of the original image is calculated at steps s103 (FIG. 8) and s201 (FIG. 9). More specifically, when standard deviations σ are calculated and the optimal LUTs are selected according to the calculated standard deviations σ for the reproduction colors, C, M, and Y, the optimal LUTs do not always agree with each other. In this case, the color balance in the reproduced image may be different from the original image. This is problematic. Accordingly, only when the densities are intensively concentrated in the same specific density range for the reproduction colors, C, M, and Y, the LUT corresponding to the same specific density range is selected. On the other hand, when the densities are intensively concentrated in different density ranges for the reproduction colors, C, M, and Y, it is judged that densities are evenly distributed, i.e., the result of the judgement is "No" at step S104 (FIG. 8) or step S202 (FIG. 9).

(2) In the first and second embodiment, a part of the gradation conversion curve (refer to each of the gradation conversion curves 61 to 65 in FIGS. 4A and 4B and FIGS. 5A to 5C) for keeping the gradation of the original image is indicated by a sloped, straight line in the LUT in the interest of simplicity (the range of the input gradation corresponding to the sloped straight line is referred to the "gradation reproduction area" in this specification). However, when the transfer characteristic of the ink sheet is not linear, a part of the gradation conversion curve corresponding to the gradation reproduction area may be indicated by a curve so that the transfer characteristic is complemented and the reproduced gradation is linear.

(3) In the first and second embodiment, the normal print mode or the high-speed print mode is set and the print speed is doubled in the high-speed print mode. The print speed may be changed in more than two levels or gradually changed. In this case, however, reproducable density range changes according to the print speed. In order to cope with the print speed change, the number of gradation levels of the output gradation in the gradation conversion characteristic may be set to change. For instance, when the print speed is set to be two-thirds of the printing speed of the normal print mode, the number of gradation levels of the output gradation is 171, i.e., the two-thirds of 256.

(4) In the first and second embodiment, three density ranges which each have 128 gradation levels, i.e., the high, middle, and low gradation ranges are set and a different LUT for gradation conversion corresponding to each of the gradation ranges is prepared for the case where the densities of an original image are intensively concentrated in a specific density range. However, the number of set density ranges is not limited to three. For instance, more than three density ranges may be set and the corresponding number of LUTs may be prepared so as to select an LUT that can reproduce the gradation of the original image more accurately according to the degree of the unevenness of the density distribution.

Note that it is preferable that the gradation reproduction area in the gradation conversion characteristic (refer to FIGS. 5A to 5C) that is used when the densities are unevenly distributed is almost the same as the gradation range where the densities are intensively concentrated. Even if the gradation range where the densities are intensively concentrated slightly shifts from the used gradation reproduction area, the original image gradation is reproduced with highly improved correctness compared with the conventional manner.

Also, the combination of the modifications (3) and (4) of the present invention is highly effective when applied to the second embodiment. For instance, when it is judged that the densities of original image data are distributed in a range of gradation values 0 to 170, the print speed is set as the two-thirds of the print speed in the normal print mode and an LUT for converting gradation values 0 to 256 into 0 to 170 is selected. By doing so, the print speed can be increased while the gradation of the original image is accurately reproduced.

(5) In the first and second embodiments, a thermal transfer printer that uses the ink sheet has been explained. The present invention, however, can be applied to other thermal image forming apparatus in which the amount of applied thermal energy has effect on the gradation reproduction. For instance, the present invention can be applied to the thermal image forming apparatus for directly printing on the thermal paper (recording medium) using the thermal head.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. An image forming apparatus that forms an image on a recording medium, comprising:

a speed setter that sets an image forming speed according to a user direction;

a gradation conversion characteristic selector that stores a plurality of gradation conversion characteristics and selects one of the gradation conversion characteristics, the gradation conversion characteristic corresponding to the image forming speed;

a data converter that converts gradation values of input image data to generate output image data according to the selected gradation conversion characteristic; and an image forming unit that forms an image on the recording medium according to the output image data at the image forming speed.

2. The image forming apparatus according to claim 1, wherein the speed setter sets one of a first speed and a second speed that is faster than the first speed.

3. The image forming apparatus according to claim 2, wherein the gradation conversion characteristic selector selects a first gradation conversion characteristic when the first speed is set and a second gradation conversion characteristic when the second speed is set, the output image data being expressed with a lower number of gradation levels according to the second gradation conversion characteristic than the first gradation conversion characteristic.

4. The image forming apparatus according to claim 2, further comprising a judging unit that judges a density characteristic of the input image data when the second speed has been set.

5. The image forming apparatus according to claim 4, wherein the gradation conversion characteristic selector selects the gradation conversion characteristic according to a judgement result of the judging unit so as to reproduce gradation of the input image data in a specific density range.

6. The image forming apparatus according to claim 5, wherein the density characteristic indicates how densities of the input image data are distributed and the specific density range corresponds to a density range where the densities are intensively concentrated.

7. The image forming apparatus according to claim 1, wherein the image forming unit forms the image by applying heat to an ink sheet using a thermal head and transferring ink from a surface of the ink sheet onto the recording medium.

8. The image forming apparatus according to claim 1, wherein the recording medium is a thermal paper, and the image forming unit forms the image on the thermal paper by applying heat to the thermal paper using a thermal head.

9. An image forming apparatus that forms an image on a recording medium, comprising:

a judging unit that judges a density characteristic of input image data;

a speed setter that sets an image forming speed according to a judgement result of the judging unit;

a data converter that converts gradation values of the input image data to generate output image data; and an image forming unit that forms an image on the recording medium according to the output image data at the image forming speed.

10. The image forming apparatus according to claim 9, wherein the speed setter sets one of a first speed and a second speed that is faster than the first speed.

11. The image forming apparatus according to claim 10, wherein the speed setter sets the second speed when the judging unit has judged that densities of the input image data are intensively concentrated in a predetermined density range.

12. The image forming apparatus according to claim 11, further comprising a gradation characteristic setter that sets, when the second speed has been set, a gradation conversion characteristic so as to reproduce gradation of the input image data in the predetermined density range, wherein the data converter converts the gradation values of the input image data according to the gradation conversion characteristic.

13. The image forming apparatus according to claim 9, wherein the image forming unit forms the image by applying heat to an ink sheet using a thermal head and transferring ink from a surface of the ink sheet onto the recording medium.

14. The image forming apparatus according to claim 9, wherein the recording medium is a thermal paper, and the image forming unit forms the image on the thermal paper by applying heat to the thermal paper using a thermal head.

15. A method for forming an image on a recording medium, comprising steps of:

setting an image forming speed according to a user direction;

setting a gradation conversion characteristic corresponding to the image forming speed;

converting gradation values of the input image data to generate output image data according to the gradation conversion characteristic; and forming an image on the recording medium according to the output image data at the image forming speed.

16. The image forming method according to claim 15, wherein the image forming speed is one of a first speed and a second speed that is faster than the first speed.

17. The image forming method according to claim 16, wherein a first gradation conversion characteristic is set when the first speed has been set and a second gradation conversion characteristic is set when the second speed has been set, the output image data being expressed with a lower number of gradation levels according to the second gradation conversion characteristic than the first gradation conversion characteristic.

18. The image forming method according to claim 16, further comprising a step of judging a density characteristic of the input image data when the second speed has been set, wherein the gradation conversion characteristic is set according to a judgement result so as to reproduce gradation of the input image data in a specific density range.

19. A method for forming an image on a recording medium, comprising steps of:

judging a density characteristic of the input image data;

setting an image forming speed according to a judgement result;

converting gradation values of the input image data to generate output image data; and forming an image on the recording medium according to the output image data at the image forming speed.

20. The image forming method according to claim 19, wherein, a first image forming speed is set when it has been judged that the density characteristic is a predetermined density characteristic, and otherwise a second image forming speed is set, the first image forming speed being faster than the second image forming speed.

* * * * *